Figure 1:
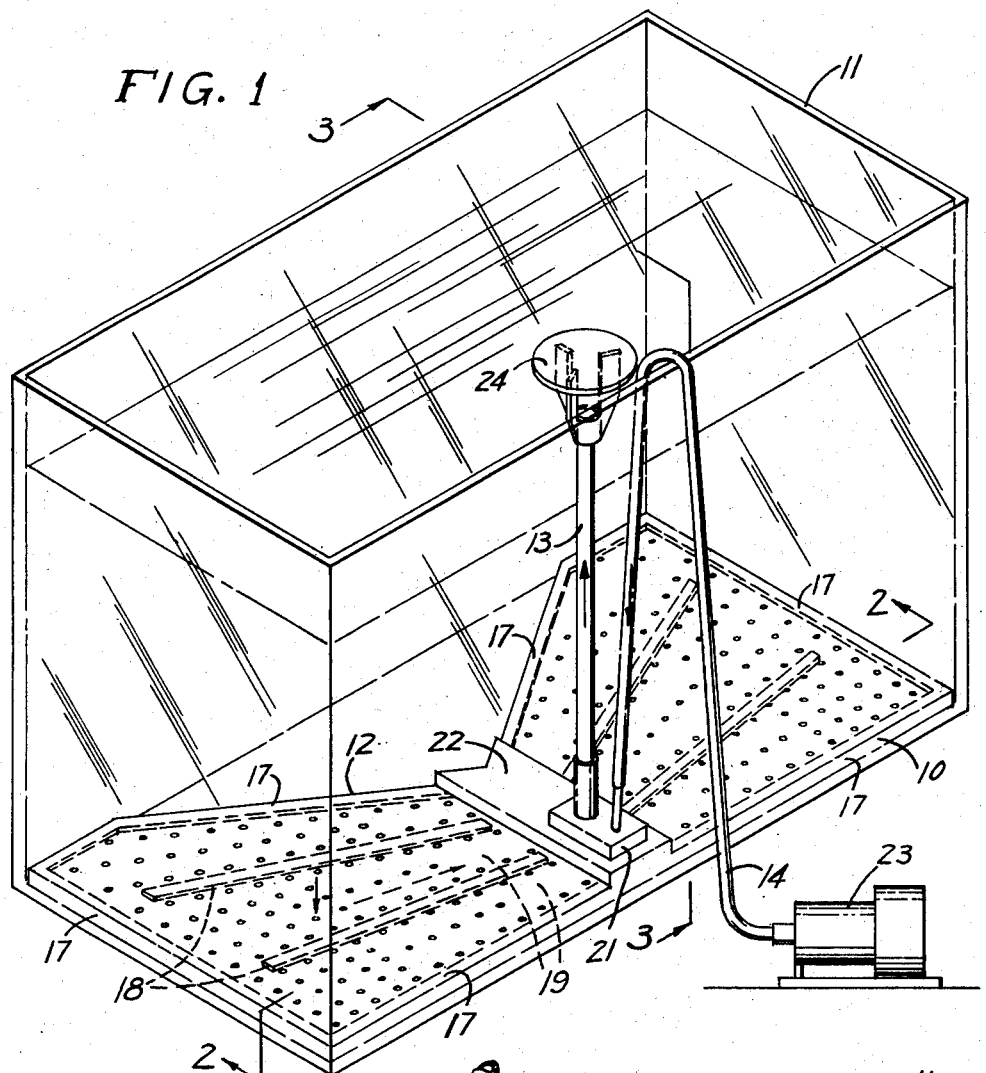

Feb. 3, 1959

E. F. HAYDEN 2,871,820

AERATOR FILTER FOR FISH AND PLANT AQUARIUM

Filed Aug. 1, 1955

2 Sheets-Sheet 1

INVENTOR.
EDWARD F. HAYDEN

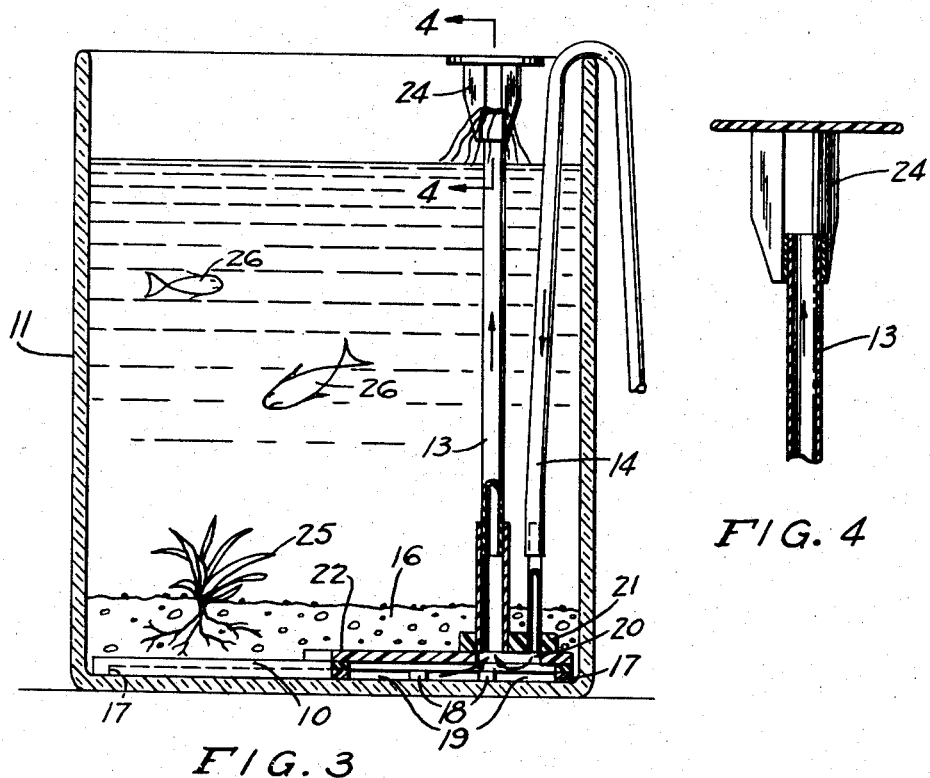
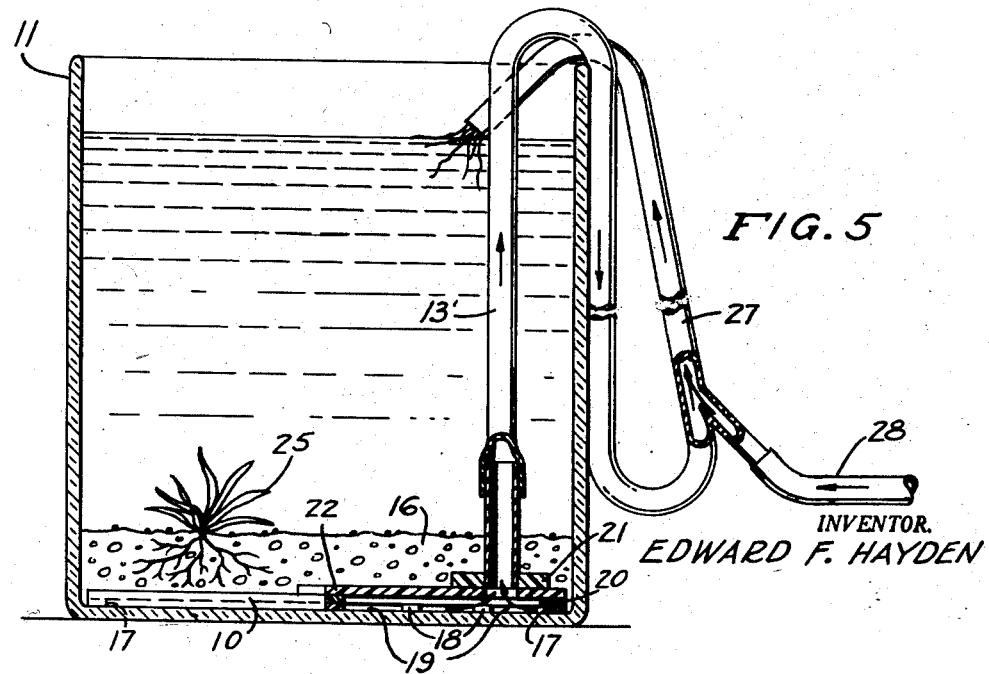

United States Patent Office 2,871,820
Patented Feb. 3, 1959

2,871,820

AERATOR FILTER FOR FISH AND PLANT AQUARIUM

Edward F. Hayden, Benton Harbor, Mich.

Application August 1, 1955, Serial No. 525,506

4 Claims. (Cl. 119—5)

This invention relates to aquarium equipment for circulating and aerating the water in an aquarium to the mutual benefit of both the fish and the plant life therein. However, it has likewise been found most suitable for use in recirculating and aerating the water in soiless gardening tanks.

Various systems of aerating and circulating or recirculating of water in aquariums have been used in the past; however, none of them have been found to be fully suitable or efficient, being deficient in one way or another. Some of the deficiencies that may be mentioned are an excessive use of air for saturating the water with as much air as it will hold, using unnecessarily large capacity pumps and wasting power. In many cases the system would provide air saturation in one part of the aquarium and not in the rest due to uneven circulation. In other systems, where the aquarium had some plant life in it, the recirculation of the aerated water would be concentrated more or less in a specific path, thru only a portion of the gravel or soil in which the plants grow, and neglecting entirely the rest of the plant life in the aquarium. Other systems would use special filters of charcoal or other filtering material which clog up easily and have to be either replaced or cleaned frequently.

The present invention has for its main object to provide a recirculating and aerating system which is most efficient, in that a minimum of air is required for saturation with maximum circulation of the aerated water uniformly throughout the entire aquarium and even distribution throughout the fine gravel provided in the bottom of the aquarium in which the plants grow rapidly.

Another object of this invention is to provide a system in which a small capacity air pump is sufficient to provide the necessary aeration and circulation of the water throughout the entire aquarium.

Another object is to provide a perforated false bottom over the major portion of the aquarium floor, leaving a quiescent zone near the middle of one side of the aquarium floor where the bigger lumps of impurities will gather for occasional removal by the usual siphoning or other means, the false bottom being covered with a layer of gravel of minimum size so as not to blind the holes in the false bottom, the space under the false bottom being divided into passages converging on a central zone from which the water is drawn by siphoning into the recirculation tube. The perforations are so distributed along these passages that a uniform suction is created over the entire false bottom so that all portions of the gravel layer will be equally traversed by the aerated water and the refuse from the fish will be pulled through the gravel layer uniformly to fertilize all the plants equally throughout the aquarium.

A further object is to provide a small capacity air pump for supplying air to the central zone and a siphon tube extending from this zone to the surface of the water.

A further object is to extend the siphon tube over the edge of the aquarium and down to a level preferably below the bottom of the tank and back up over the edge of the tank, the latter portion being provided with a supply of air from the pump to cause the siphoning action instead of directing the air into the central zone under the false bottom.

A further object is to provide a system which will circulate the water thru the gravel and aerate it sufficiently uniformly throughout the aquarium to prevent the building up of harmful and offensive gases which turn the gravel black.

A further object is to provide equipment in an aquarium which will assure this recirculation method and which will be eye catching and at the same time will avoid the usual splashing at the siphon outlet generally caused by using an excessive amount of air to move the column of water, or its introduction at a level too close to the surface of the water.

Figure 2:
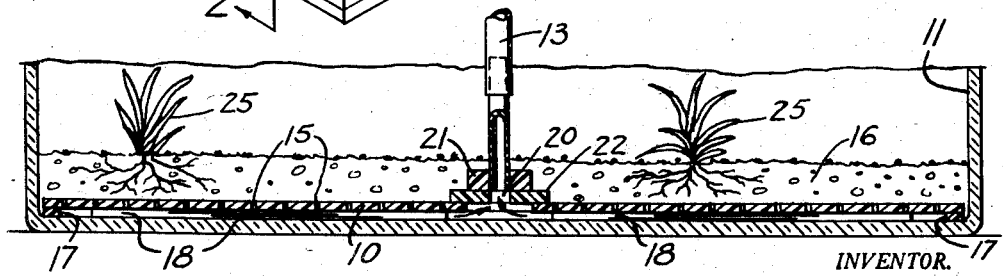

Other and more specific objects will become apparent in the following detailed description of a preferred form of equipment to be used in the present invention for purposes of illustration, having reference to the accompanying drawings, wherein:

Fig. 1 is a general perspective view of one form of this invention showing its arrangement in the aquarium, omitting the gravel on the false bottom and the fish and plant life in order to show the construction more clearly, Fig. 2 is an enlarged section taken on the line 2—2 of Fig. 1 showing the arrangement of the gravel and plants distributed over the false bottom, Fig. 3 is an enlarged section taken on the line 3—3 of Fig. 1 also showing the arrangement of the gravel layer on the false bottom and some fish in the water, Fig. 4 is an enlarged detail view taken on the line 4—4 of Fig. 3 showing one particular form of siphon tube outlet above the surface of the water, and Fig. 5 is a similar view illustrating another form of siphon tube and air inlet.

While the first form with the umbrella cover over the outlet of the siphon tube as illustrated in Figs. 1, 3 and 4 is more attractive and suitable for home use, the form of siphon tube and air inlet shown in Fig. 5 is more efficient and more suitable for use by commercial aquariums where fish life is sold. The latter form having only a single tube rising from the false bottom is not so obstructive to the use of nets, where fish have to be dipped out for purchasers. Furthermore, this latter construction permits the use of a longer siphon tube for faster flow with less air and better aeration.

As may be seen in Fig. 1 the outline of the false bottom 10 is made to conform substantially to the bottom of the tank 11 except for a V-shaped cutout portion 12 which provides a quiescent zone, where the gross impurities accumulate for periodical removal. The false bottom 10 as well as the tubing 13 and 14 may be made of transparent plastics, or any other suitable materials. The false bottom 10 is perforated throughout with perforations 15 somewhat smaller than the size of the gravel 16 so that they will not be blinded by the gravel or permit the gravel to pass through them. This false bottom is spaced from the bottom of the tank by a peripheral raised edge 17 under the false bottom, which conforms to the bottom of the tank to form a substantial seal. The space between the false bottom and the bottom of the tank is divided by bridging strips 18 to form passages 19 converging on the central zone 20, which is under the raised zone 21 of the central portion 22 of the false bottom, and the perforations 15 are more numerous as they are more distant from the central zone 20, so as to provide a substantially uniform suction throughout the false bottom when the siphon action is in operation. The air pump 23 supplies air thru the tubing 14 into this raised air space 20 and the air naturally rises into the siphon tube 13, displacing some of the water therein, and the column in the siphon tube 13 is therefore made lighter and causes the column of water in the siphon tube to rise. The water thus drawn up provides a lower pressure in the space under the false bottom than the water pressure above it, causing the water to flow downwardly through the perforations. The water in the siphon tube 13 is thus aerated as it passes up the tube 13 and flows over into the tank. The umbrella cover 24 over the outlet from the siphon tube prevents splashing of the water outside of the tank.

The gravel 16 may be spread over the false bottom 10 in a substantially even layer as shown in Figs. 2, 3 and 5. Any plants 25 and fish 26 kept in this aquarium will mutually benefit each other, since the plants will supply a certain amount of food for the fish, whereas the fish by their droppings will supply the fertilization for the plants, and the aerated water circulation is beneficial for both the fish and the plants, as well as being essential to the even distribution of the fertilization and the aeration of the plant roots.

In Fig. 5 a modified form of the siphon tube 13' is shown, the siphon is extended over the top of the tank 11 down to a level below the bottom of the tank 11 and then up again over the top of the tank where the water is discharged. In this last portion 27 of the siphon tube 13' where the water flows upward, an air inlet 28 is connected, instead of leading the air down to the false bottom as shown in Figs. 1, 3 and 4. This eliminates the air tube 14 in the tank and requires only one tube 13' which is less of an obstruction than the two tubes shown in the first form, and makes it easier for the aquarium dealer to catch the fish when he wants to dip them out for customers. The air being directed in the direction of flow of the siphoned water in this form, and at a lower level, assists in increasing the water flow, making the air pump more efficient in operating this system.

The system here illustrated eliminates the necessity of using any special filters, because the gravel in which the plants are planted in this case, provides all the necessary filtering action at the same time that it supplies the fertilizing medium to the plants and disposes of the excess food as well as droppings and broken leaves in an aquarium having a fair balance between plants and fish.

The present arrangement virtually creates a self cleaning filter which will clear the suspended particles from the open part of the tank, thus removing the suspended matter from view, yet not withdrawing it from the tank, because it can be used to advantage by the plants. The fine particles and droppings are drawn into the gravel in which the plant roots are imbedded and the soluble portions of the plant food are made quickly available to the plants causing them to grow faster and more uniformly throughout the tank. As already mentioned, the distribution of the perforations and the arrangement of the converging passages under the false bottom are such, that a substantially uniform differential of pressure is created on opposite sides of the false bottom when a normal flow of water through the siphon tube is instituted by the operation of the air pump. The converging form of the passages make it less necessary to increase the number of perforations per unit area with the distance from the central portion of the false bottom in order to get a substantially uniform pressure differential throughout the entire area of the false bottom. In any event, if the circulation of the water is not exactly uniform throughout the area of the false bottom under some conditions of siphoning speeds, nevertheless an ample amount of circulation may be assured throughout the entire sand layer at normal siphoning speeds by a proper apportionment of perforations and convergence of the passages.

Obviously many modifications in the form and arrangement of parts may be made without departing from the spirit and scope of the present invention, as defined in the appended claims.

What is claimed is:

1. For use in connection with an aquarium tank having a rectangular floor, for the keeping of fish and aquatic plant life above a sand or gravel bed: a plate-like false bottom having outer dimensions just slightly smaller than the floor of the tank with which it is to be used, to enable it to be easily placed in the tank, while extending substantially to the corners of the tank floor, said bottom covering only the major portion of the tank floor, a marginal strip extending completely around the under edge of the false bottom, to raise it above the tank floor and to provide a substantial seal for the space enclosed thereby, an eduction tube connected to the upper side of the false bottom at a point substantially equidistant from at least two opposite edges of the bottom and bridging strips on the underside of the bottom, dividing the space therebeneath into a plurality of straight passages, each and all converging directly toward the point of connection of the eduction tube, said bottom plate having a plurality of perforations passing through said bottom, upwardly of said straight passages, said perforations being more numerous over the more remote sections of said passages to substantially balance the flow of water through equal areas of said plate.

2. The combination of claim 1, said eduction tube extending straight upwardly to an open end, and including a horizontally extending baffle supported by and above the end portion of said tube.

3. The combination of claim 1, said eduction tube including three generally parallel arms each adjacent pair of arms being connected by a reverse loop and a third reverse loop on the end of the tube remote from its connection to said bottom plate.

4. The combination of claim 3, including a side tube connected to said eduction tube and directed away from the plate connection, for the injection of an eduction fluid.

References Cited in the file of this patent

UNITED STATES PATENTS

| | | |
|---|---|---|
| 1,574,783 | Beth | Mar. 2, 1926 |
| 2,491,853 | Feldman | Dec. 20, 1949 |
| 2,636,473 | Schwartz et al. | Apr. 28, 1953 |
| 2,730,496 | Zavod | Jan. 10, 1956 |